United States Patent
Lueger

(10) Patent No.: US 8,350,536 B2
(45) Date of Patent: Jan. 8, 2013

(54) CIRCUIT ARRANGEMENT FOR THE SUPPLYING OF ENERGY FROM A POWER SOURCE TO AN ELECTRICAL LOAD

(75) Inventor: Manfred Lueger, Preding (AT)

(73) Assignee: Austriamicrosystems AG, Unterpremstatten (AT)

( * ) Notice: Subject to any disclaimer, the term of this patent is extended or adjusted under 35 U.S.C. 154(b) by 686 days.

(21) Appl. No.: 12/087,022

(22) PCT Filed: Dec. 15, 2006

(86) PCT No.: PCT/EP2006/012135
§ 371 (c)(1),
(2), (4) Date: Nov. 12, 2009

(87) PCT Pub. No.: WO2007/079907
PCT Pub. Date: Jul. 19, 2007

(65) Prior Publication Data
US 2011/0316488 A1 Dec. 29, 2011

(30) Foreign Application Priority Data
Dec. 21, 2005 (DE) .......................... 10 2005 061 207

(51) Int. Cl.
*H02J 7/06* (2006.01)
(52) U.S. Cl. ........................................ 320/164; 320/166
(58) Field of Classification Search .................... 320/164
See application file for complete search history.

(56) References Cited

U.S. PATENT DOCUMENTS

| 3,864,617 | A | * | 2/1975 | Smith et al. .................... 320/159 |
| 4,860,354 | A | * | 8/1989 | van Roermund ................. 381/7 |
| 5,708,348 | A | | 1/1998 | Frey et al. |
| 6,144,187 | A | | 11/2000 | Bryson |
| 6,664,765 | B2 | | 12/2003 | Dotzler et al. |
| 6,924,760 | B1 | | 8/2005 | McLeod et al. |
| 2003/0141850 | A1 | | 7/2003 | Dotzler et al. |
| 2004/0095115 | A1 | | 5/2004 | Kernahan et al. |
| 2005/0007075 | A1 | | 1/2005 | Woo et al. |
| 2006/0132141 | A1 | * | 6/2006 | Dougherty et al. ........... 324/435 |
| 2006/0181244 | A1 | * | 8/2006 | Luo et al. ...................... 320/128 |

(Continued)

FOREIGN PATENT DOCUMENTS

WO WO 00/62398 10/2000

OTHER PUBLICATIONS

K. Watanabe et al., "A Switched-Capacitor Multiplier/Divider with Digital and Analog Outputs", IEEE Transactions on Circuits and Systems, vol. CAS-31, No. 9, pp. 796-800, Sep. 1984.

(Continued)

*Primary Examiner* — Arun Williams
(74) *Attorney, Agent, or Firm* — Cozen O'Connor

(57) ABSTRACT

A circuit arrangement for supplying energy, comprising: a first input adapted to receive a first voltage from a first terminal of a control component, a second input adapted to receive a second voltage from a second terminal of the control component, a first output adapted to receive output a control signal to a control terminal of the control component for controlling an energy supply of an electrical load; and a power determining arrangement, comprising a switched-capacitor arrangement having an input coupled to the first and the second input of the circuit arrangement and an output coupled to the first output of the circuit arrangement.

30 Claims, 9 Drawing Sheets

U.S. PATENT DOCUMENTS

2008/0284411 A1* 11/2008 Kunc et al. ............... 324/123 R

OTHER PUBLICATIONS

Moussavi, M. et al., "A Differential Bipolar Quasi-Passive Cyclic Digital-to-Analog Converter with 4.416 MSps Conversion Rate and −77 dB THD", IEEE Custom Integrated Circuits Conference, pp. 161-164, 2001.

Suárez, R. et al., "All-MOS Charge Redistribution Analog-to-Digital Conversion Techniques—Part II", IEEE Journal of Solid-State Circuits, vol. 10, No. 6, pp. 379-385, Dec. 1975.

* cited by examiner

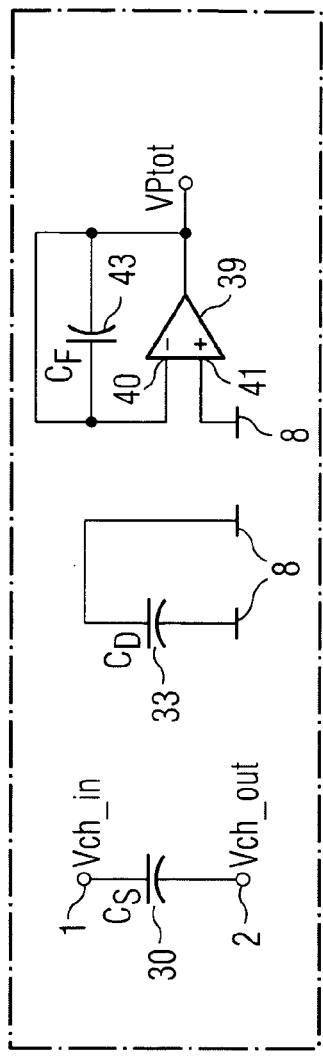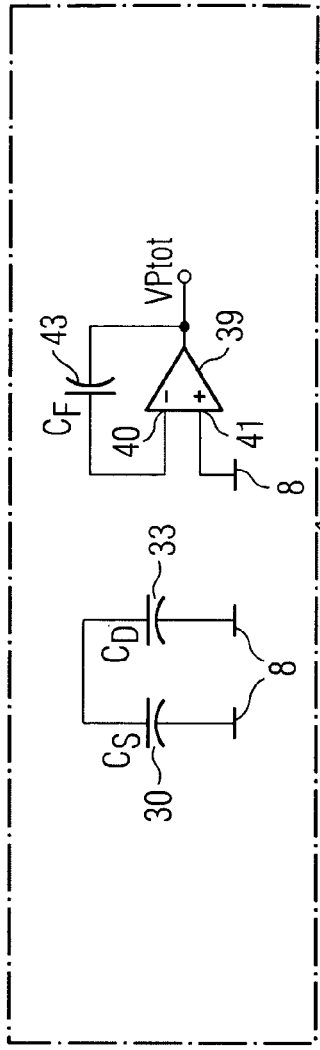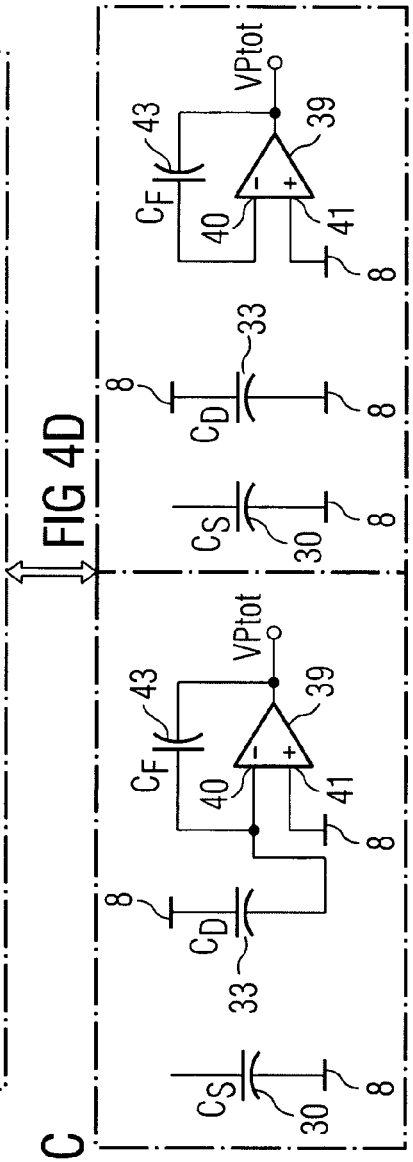

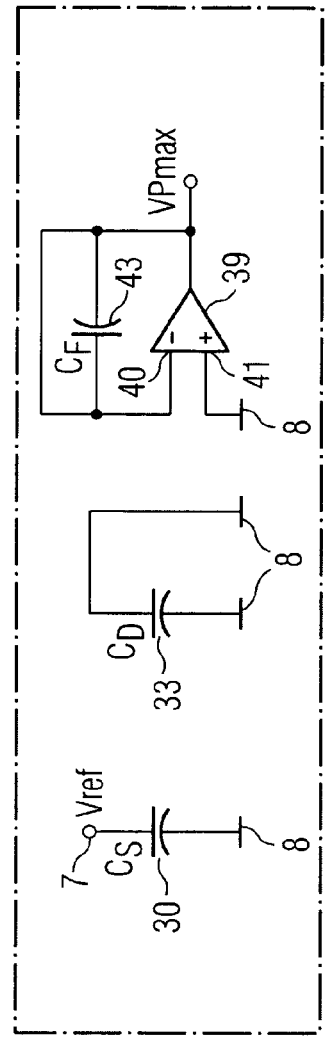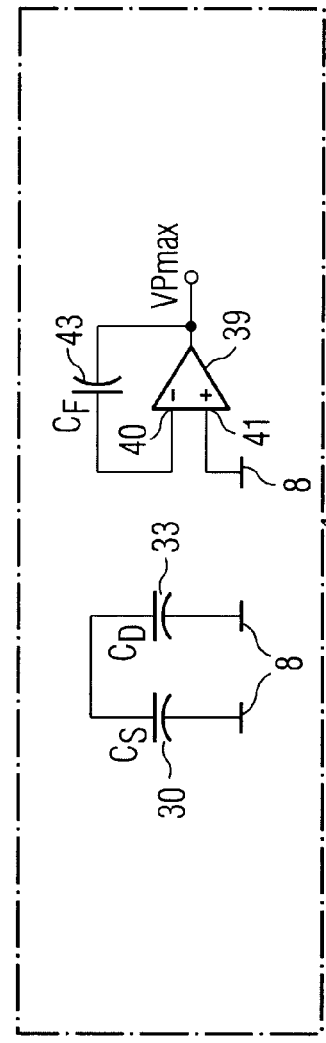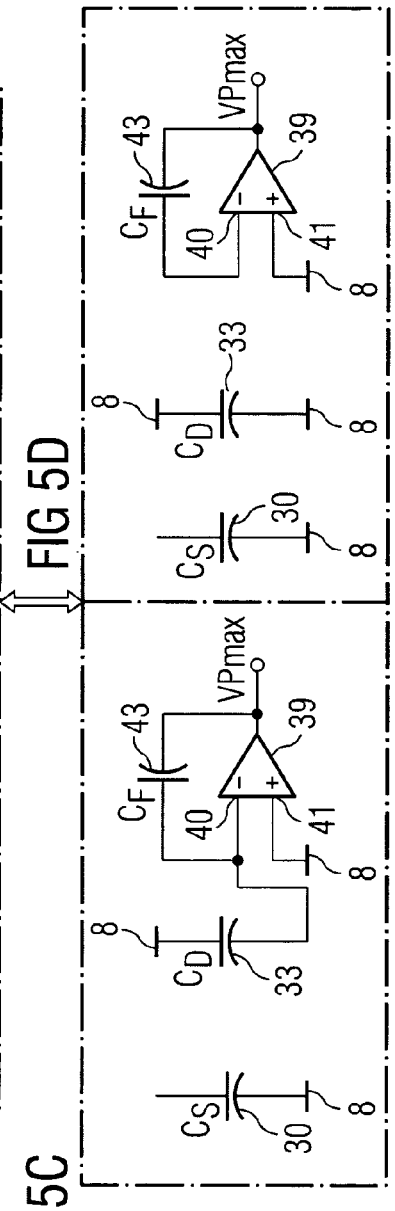

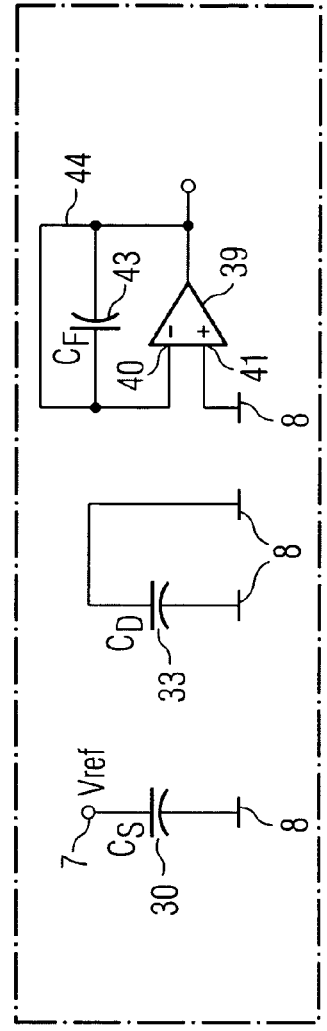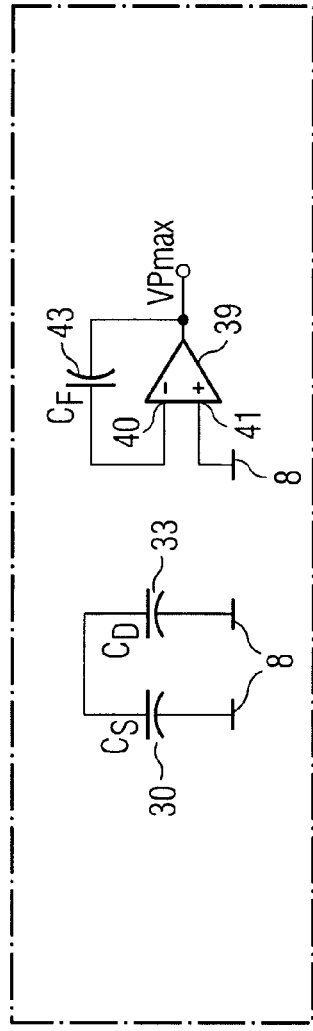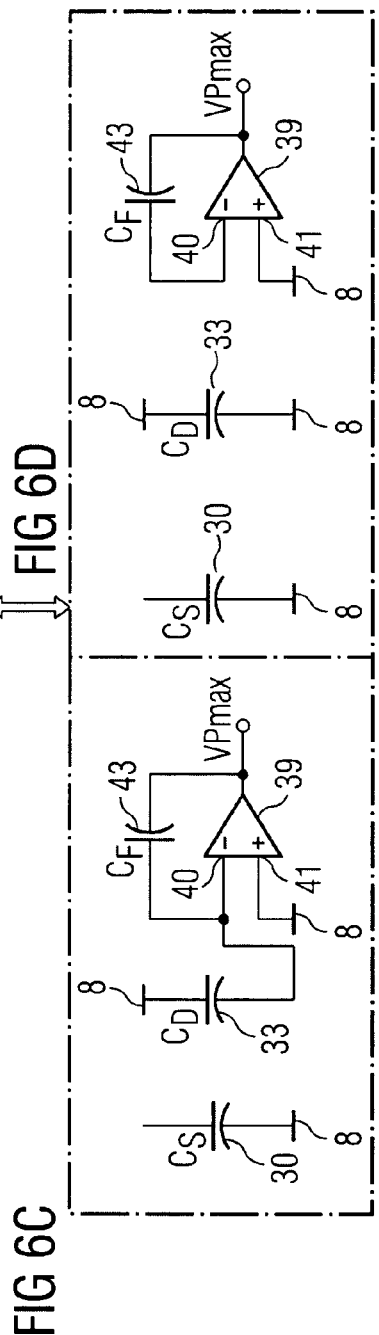

CIRCUIT ARRANGEMENT FOR THE SUPPLYING OF ENERGY FROM A POWER SOURCE TO AN ELECTRICAL LOAD

RELATED APPLICATIONS

This is a U.S. national stage under 35 USC 371 of application No. PCT/EP2006/012135, filed on 15 Dec. 2006.

This application claims the priority of German applications no. 10 2005 061 207.5 filed Dec. 21, 2005, the entire content of which is hereby incorporated by reference.

FIELD OF THE INVENTION

The present invention relates to a circuit arrangement for supplying energy, an energy-supply arrangement, a use of the energy-supplying arrangement, and a method for charging a battery.

Such circuit arrangements for supplying energy can be used for charging a rechargeable battery.

BACKGROUND OF THE INVENTION

Document U.S. Pat. No. 6,664,765 B2 describes a battery charging arrangement with power limiting. The arrangement comprises a circuit for charge control, a circuit for current measurement, and also a control arrangement with an analog/digital converter, a computational unit, and a memory.

SUMMARY OF THE INVENTION

One object of the present invention is to provide a circuit arrangement for supplying energy, an energy-supply arrangement, and a method for charging a battery, with which power can be determined in a control component and can be realized economically.

This and other objects are attained in accordance with one aspect of the present invention directed to a circuit arrangement comprising a first and a second input, a first output, and a power determining arrangement. The first input of the circuit arrangement is connected to a first terminal of a control component that can be connected. Similarly, the second input of the circuit arrangement is connected to a second terminal of the control component that can be connected. The first output of the circuit arrangement is coupled to a control terminal of the control component that can be connected. The power determining arrangement comprises a switched-capacitor arrangement. The switched-capacitor arrangement has an input coupled to the first and the second input of the circuit arrangement. At one output, the switched-capacitor arrangement is coupled to an output of the power determining arrangement. The output of the power determining arrangement is coupled, in turn, to the first output.

At the first terminal of the control component that can be connected, a first voltage can be tapped, which is fed to the circuit arrangement via the first input. Accordingly, a second voltage can be tapped at the second terminal of the control component that can be connected. The second voltage is fed to the circuit arrangement via the second input. At the first output of the circuit arrangement, a control signal is provided, which is fed to the control terminal of the control component that can be connected. The first and second voltages are fed to the switched-capacitor arrangement. The circuit arrangement is designed in such a way that, as a function of a signal on the first output of the switched-capacitor arrangement, a control signal can be tapped at the first output of the circuit arrangement, which is coupled to an output of the power determining arrangement.

Advantageously, for determining the power, the first and second voltages, which can be tapped at the two terminals of the control component that can be connected, are taken into consideration.

Advantageously, the switched-capacitor arrangement for determining the power can be realized economically.

The switched-capacitor arrangement can be provided for processing electrical variables, especially electrical measurement variables. The switched-capacitor arrangement can be used for determining the electrical power.

In one embodiment, the switched-capacitor arrangement can be constructed as a multiplier. The switched-capacitor arrangement can comprise a multiplying unit and a clock generator. The switched-capacitor arrangement can be realized for multiplying a digitally coded value with an analog value. The digitally coded value can be a digitally coded current value. The analog value can be a voltage. The analog value is preferably a voltage difference. The switched-capacitor arrangement can be designed for multiplying a difference of the first and second voltages with the current value. One advantage of the power determining arrangement with the switched-capacitor arrangement is that it can be realized with little expense, because no additional analog/digital converter is necessary for converting the analog value of the voltage difference into a digitally coded value for multiplication in digital technology or alternatively, no additional digital/analog converter is necessary for converting the digitally coded current value for multiplication in analog technology.

The current value can be fed as a digitally coded current limiting value to the circuit arrangement and thus to the multiplying unit. The current limiting value can be fed via a bus, in particular, a serial bus, to the circuit arrangement. In an alternative embodiment, the current limiting value is stored in a permanent or programmable way in the circuit arrangement. The current limiting value can be stored in a register with a first number of N bits. Alternatively, the current value can be determined from a charge current flowing through the control component and provided to the multiplying unit. The multiplying unit in the switched-capacitor arrangement can be realized as a digital/analog converter.

In one refinement, the multiplying unit comprises an input capacitor, a transfer capacitor, and an integrator. In one embodiment, the integrator features an amplifier, a coupling capacitor, and a switch. The couplings and connections within the multiplying unit can comprise switches. The switches can be constructed as field-effect transistors. In one embodiment, the input capacitor, the transfer capacitor, and the coupling capacitor can feature the same capacitance value. In this embodiment, because there is no scaling between the three capacitors, advantageously the three capacitors can be realized on a small surface area.

In one alternative embodiment, the multiplying unit comprises a first voltage divider, which is connected between the first input of the circuit arrangement and a first electrode of the input capacitor. Accordingly, a second voltage divider can be connected between the second input of the circuit arrangement and a second electrode of the input capacitor. Advantageously, a first and a second voltage can also be processed with higher values. The input and/or the transfer and/or the coupling capacitors can be configured as polysilicon capacitors or alternatively as metal capacitors.

In one refinement, the power determining arrangement features a subtracter, which is connected between the output of the switched-capacitor arrangement and the output of the power determining arrangement. For this purpose, the subtracter can be connected at a first input to the output of the switched-capacitor arrangement. At a second input, a power limiting value can be fed to the subtracter.

In one embodiment, a digital power limiting value can be fed to the circuit arrangement. In an improvement, the digital power limiting value can be fed by means of a bus to the circuit arrangement. The power limiting value can be stored in a register with a second number of M bits. The power determining arrangement can comprise another digital/analog converter, which is provided for preparing a power limiting value as an analog signal from a digital power limiting value. An analog limiting value can be fed to the subtracter. The subtracter can be constructed as a differential amplifier. Alternatively, the subtracter can be realized as a comparator.

In one embodiment, the power determining arrangement has a correction device, which has an input coupled to the output of the subtracter and an output coupled to the output of the power determining arrangement. The current limiting value can be fed to the correction device. The correction device is provided for preparing a maximum current value. The correction device can have a linear amplifier, also called a proportional amplifier. It can also comprise an integrator and/or a differentiator.

In one refinement, the circuit arrangement features a second output, so that a charging current, which flows through the control component that can be connected, is fed to the second input of the circuit arrangement and can be output via the second output of the circuit arrangement. In one embodiment, the circuit arrangement features a current determining arrangement, which is connected between the second input and the second output of the circuit arrangement and through which the charging current flows. The current determining arrangement can be designed to determine a charging current value of the charging current. In one embodiment, the current determining arrangement features a resistor that connects the second input and the second output of the circuit arrangement. The current determining arrangement can comprise a voltage tapping circuit for determining the charging current value from a voltage drop across the resistor.

In one embodiment, an output of the current determining arrangement can be connected to the switched-capacitor arrangement for providing the charging current value as the current value. In one embodiment, the current value can be an analog value. In a preferred embodiment, the current value is provided as a digitally coded value.

In one refinement, the circuit arrangement comprises a control arrangement having an input coupled to the output of the power determining arrangement and an output coupled to the first output of the circuit arrangement. The control arrangement is designed for providing the control signal.

In one refinement, the control arrangement has an input coupled to an output of the current determining arrangement for feeding the charging current value. The control arrangement is designed to perform a comparison of the charging current value and the maximum current value and to provide the control signal as a function of the comparison.

In one refinement, the circuit arrangement features a third input, by means of which the control arrangement can be connected to a terminal of an attachable battery. A voltage limiting value can be fed to the control arrangement. The voltage limiting value can be stored in a register with a third number of L bits. The control arrangement thus can be designed for the comparison of the battery voltage and the voltage limiting value and for the output of the control signal as a function of the comparison. In an alternative embodiment, the control arrangement is connected to the second output of the circuit arrangement for feeding the battery voltage.

The control arrangement can have a digital computational unit. The control arrangement can comprise a first and a second comparator. The first comparator has an input coupled to the output of the power determining arrangement and to the output of the current determining arrangement. The maximum current value and the charging current value are fed to an input of the first comparator. At an output of the first comparator a signal can be tapped as the result of a comparison of the maximum current value and the charging current value. The battery voltage and the voltage limiting value are fed to an input of the second comparator. At an output of the second comparator a signal prepared as a function of a comparison between the battery voltage and the voltage limiting value can be tapped.

According to one aspect of the invention, an energy-supply arrangement comprises a circuit arrangement as described above and also a control component, which is connected at the first and the second terminal to the first or second input of the circuit arrangement and at the control terminal to the first output of the circuit arrangement. In one embodiment, the control component has a transistor. The transistor can be constructed as a bipolar transistor. In another embodiment, the transistor is realized as a field-effect transistor. Alternatively, the control component comprises a Darlington circuit.

In one embodiment, the energy-supply arrangement has a direct-voltage source, which is connected to the first terminal of the control component. Preferably, the direct-voltage source is realized as a power-supply part. The power-supply part can be constructed as a plug power-supply part.

The energy-supply arrangement can be used for operating an electrical load, such as, for example, a lighting device or a display device. The energy-supply arrangement can be used preferably for charging a rechargeable battery. The battery can be coupled to the second terminal of the control component.

The circuit arrangement can be realized on a semiconductor body. In an alternative embodiment, the semiconductor body can also comprise the control component.

Another aspect of the present invention is directed to a method for supplying energy, in particular, for charging a battery, provides the following steps: a charging current flows through a control component to an electrical load and is controlled by the control component. The electrical load can be, in particular, a battery. A total power value is determined as a function of a voltage drop across the control component and a current limiting value. The total power value is compared with a power limiting value. A control signal is prepared as a function of the comparison result and fed to the control component. Thus, advantageously, the control component is set according to the power limiting value.

Preferably, the total power value is determined by multiplying the voltage drop across the control component with the current limiting value by means of a switched capacitor circuit.

In summary, the above-described technique has the following advantages:
  the control component is set as a function of a voltage drop across the control component. The power, which is consumed in the control component and which is waste power, can be set smaller than the power limiting value. Thus, the control component is protected from thermal overload and can be designed according to the adjustable power limiting value.

the power is determined by means of a switched-capacitor arrangement and therefore can be realized very cost-effectively.

Details of several embodiments of the invention are explained below with reference to the figures. Components with the same function or effect carry the same reference symbols. As far as the circuit parts or components correspond in their function, their description will not be repeated in each of the following figures.

BRIEF DESCRIPTION OF THE DRAWINGS

FIGS. 4A to 4D show example processing steps for determining a total power value.

FIGS. 5A to 5D show example processing steps for determining a power limiting value.

FIGS. 6A to 6H show example processing steps for determining a difference between the power limiting value and total power value.

DETAILED DESCRIPTION OF THE DRAWINGS

Figure 1A:
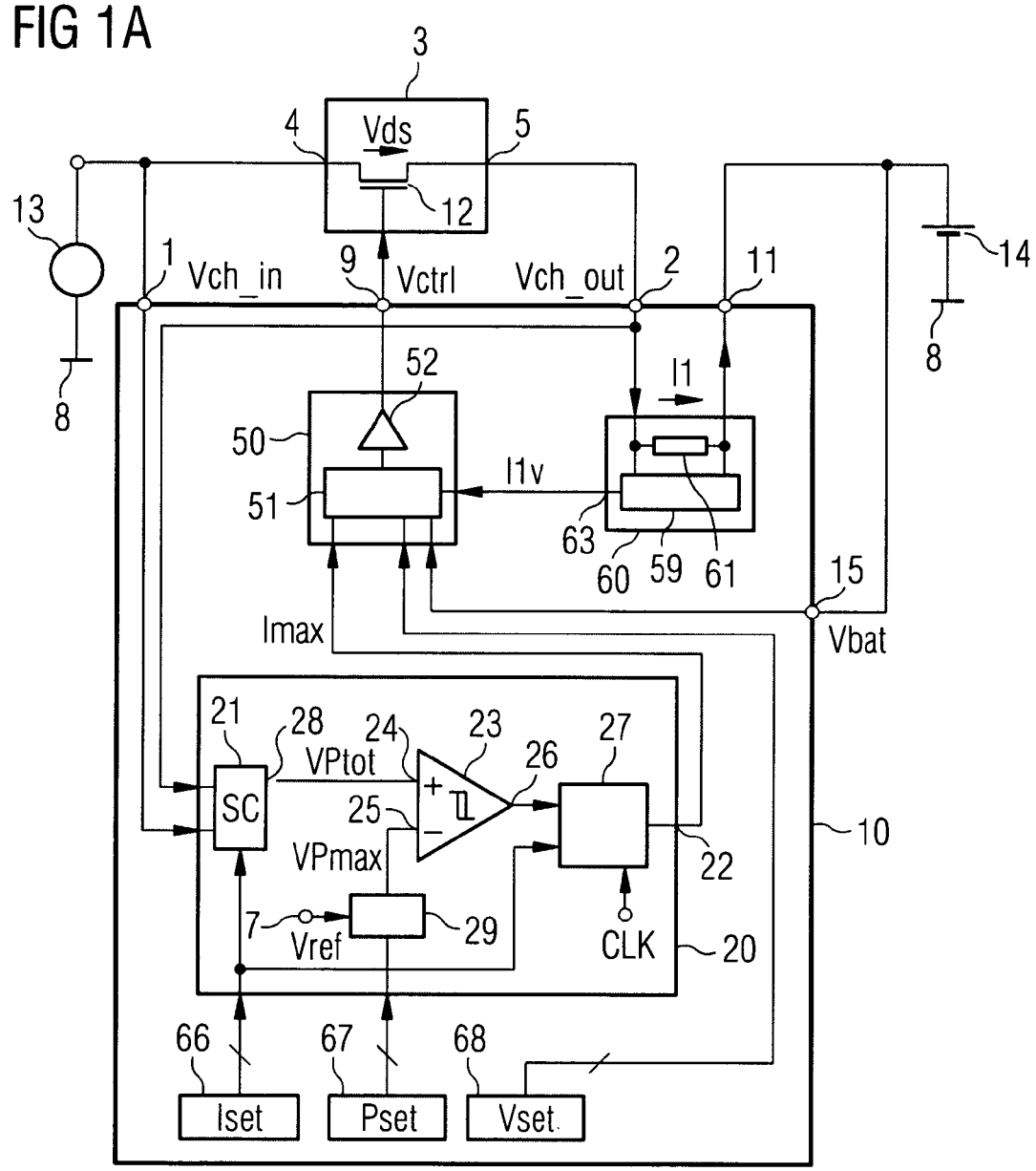
FIGS. 1A and 1B show embodiments of an energy-supply arrangement with a circuit arrangement according to the invention.

FIG. 1A shows an embodiment of the energy-supply arrangement with a circuit arrangement 10 according to the invention, a power-supply part 13, a control component 3, and a battery 14. The circuit arrangement 10 comprises a power determining arrangement 20, a control arrangement 50, a power determining arrangement 60, and three registers 66, 67, 68. The power determining arrangement 20 has an input coupled is to a first input 1 and to a second input 2 of the circuit arrangement 10. Furthermore, the power determining arrangement 20 has an input coupled to a register 66 for feeding a current limiting value Iset and to a register 67 for feeding a digital power limiting value Pset. The power determining arrangement 20 comprises a switched-capacitor arrangement 21 having its output 28 connected to a first input 24 of a subtracter 23. At one output 26 of the subtracter 23, a correction device 27 is attached, which has an input coupled side to the register 66. An output 22 of the power determining arrangement is connected to an output of the correction device 27. Furthermore, the power determining arrangement 20 comprises a digital/analog converter 29, having an input coupled to the register 67 and an output coupled to a second input of the subtracter 25.

The circuit arrangement 10 further has a second output 11. The second input 2 and the second output 11 are coupled by means of the current determining arrangement 60. The current determining arrangement 60 has a resistor 61, which is coupled at one terminal to the second input 2 and at another terminal with the second output 11. One output 63 of the current determining arrangement 60 is connected to an input of the control arrangement 50. Furthermore, the control arrangement 50 is connected to the output 22 of the power determining arrangement 20, to a register 68 for feeding a voltage limiting value Vset and to a third input 15 of the circuit arrangement 10. The control arrangement 50 has a computational unit 51 and an output driver 52, which is connected between the computational unit 51 and a first output 9 of the circuit arrangement. The computational unit 51 is connected to the inputs of the control arrangement 50.

At the first and the second input 1, 2 of the circuit arrangement 10, a first and a second voltage Vch_in, Vch_out can be tapped, which are fed to the power determining arrangement 20 and the switched-capacitor arrangement 21 comprising the power determining arrangement 20. The first and the second voltage Vch_in, Vch_out are provided as analog values, in particular, as continuous values. A current limiting value Iset is similarly fed to the power determining arrangement 20 and thus the switched-capacitor arrangement 21. The current limiting value Iset is digitally coded, in particular, as discrete values. From these three input values, by means of the switched-capacitor arrangement 21, a total power value VPtot is determined, which is fed to the first input 24 of the subtracter 23. The total power value VPtot is provided as an analog value, in particular, as a continuous value. The switched-capacitor arrangement 21 thus performs a digital-to-analog conversion with simultaneous multiplication. The factors of this multiplication are the current limiting value Iset and the difference between the first voltage Vch_in and the second voltage Vch_out.

A digital power limiting value Pset is converted by the digital/analog converter 29 into an analog power limiting value VPmax and fed to the second input of the subtracter 23. At the output 26 of the subtracter 23, a signal can be tapped as a function of the subtraction of the total power value VPtot minus the power limiting value VPmax and is fed to the correction device 27. Similarly, the current limiting value Iset is fed to the correction device 27. The correction device 27 provides a maximum current value Imax as a function of the signal at the output of the subtracter 23, to the current limiting value Iset and to a clock signal CLK. The maximum current value Imax can be provided in digitized form.

Imax is determined as follows:

$$I\max = P3 - P\text{set}$$

(wherein P3 is the power loss of device 3, Pset is the maximum power loss), and for P3 and Pset the following functions are valid:

$$VP\text{tot} = (V\text{ch\_in} - V\text{ch\_out}) * (I\text{set}/I0) \sim P3$$

$$VP\max = V\text{ref} * (P\text{set}/P0) \sim P\text{set}$$

with I0=LSB of Iset and P0=LSB of Pset
P3 is therefore proportional to VPtot and Pset is proportional to VPmax
LSB means Least Significant Bit.

The charging current I1 flows through the current determining arrangement 60. The voltage tapping circuit 59 coupled to the two terminals of the resistor 61 is designed to provide at its output a charging current value I1v on the output 63 of the current determining arrangement 60.

Thus, the maximum current value Imax, the charging current value I1v, the voltage limiting value Vset, and the battery voltage Vbat are fed to the control arrangement 50. By means of the computational unit 51 in the control arrangement 50, the maximum current value Imax is compared with the charging current value I1v and the voltage limiting value Vset is compared with the battery voltage Vbat. According to the comparison results, the control voltage Vctrl is provided by the computational unit 51 via the output driver 52 at the output 9 of the circuit arrangement 10. The control signal Vctrl is fed to the control terminal of the transistor 12. A voltage drop Vds can be tapped between the two terminals of the transistor 12.

Vctrl is generated as a function of the input signals Imax, Vset, Vbat, I1v as follows:

If Vbat<Vset: Vctrl is controlled such that a detected charging current I1v is equal to desired Imax. This is normally referred to as Constant Current Mode.

If Vbat=Vset: Vctrl is modified such that I1v is reduced until Vbat remains equal to Vset. This is normally referred to as Constant Voltage Mode.

If Vbat>Vset: Vctrl is controlled such that device 3 is deactivated, i.e. Iv1=0 is achieved (charger off).

Advantageously, by means of the circuit arrangement 10, it is achieved that waste power in the control component 3, which occurs due to energy consumption in the control component 3, is smaller than a digital power limiting value Pset or a power limiting value VPmax. Advantageously, by means of the power determining arrangement 60, the power determining arrangement 20, and the control arrangement 50 it is achieved that the current I1 flowing through the control component 3 is smaller than an adjustable current limiting value Iset. Advantageously, by means of the control arrangement 20 and the feeding of the battery voltage Vbat, it is achieved that the battery voltage Vbat reaches a maximum of the magnitude of the voltage limiting value Vset.

Figure 1B:
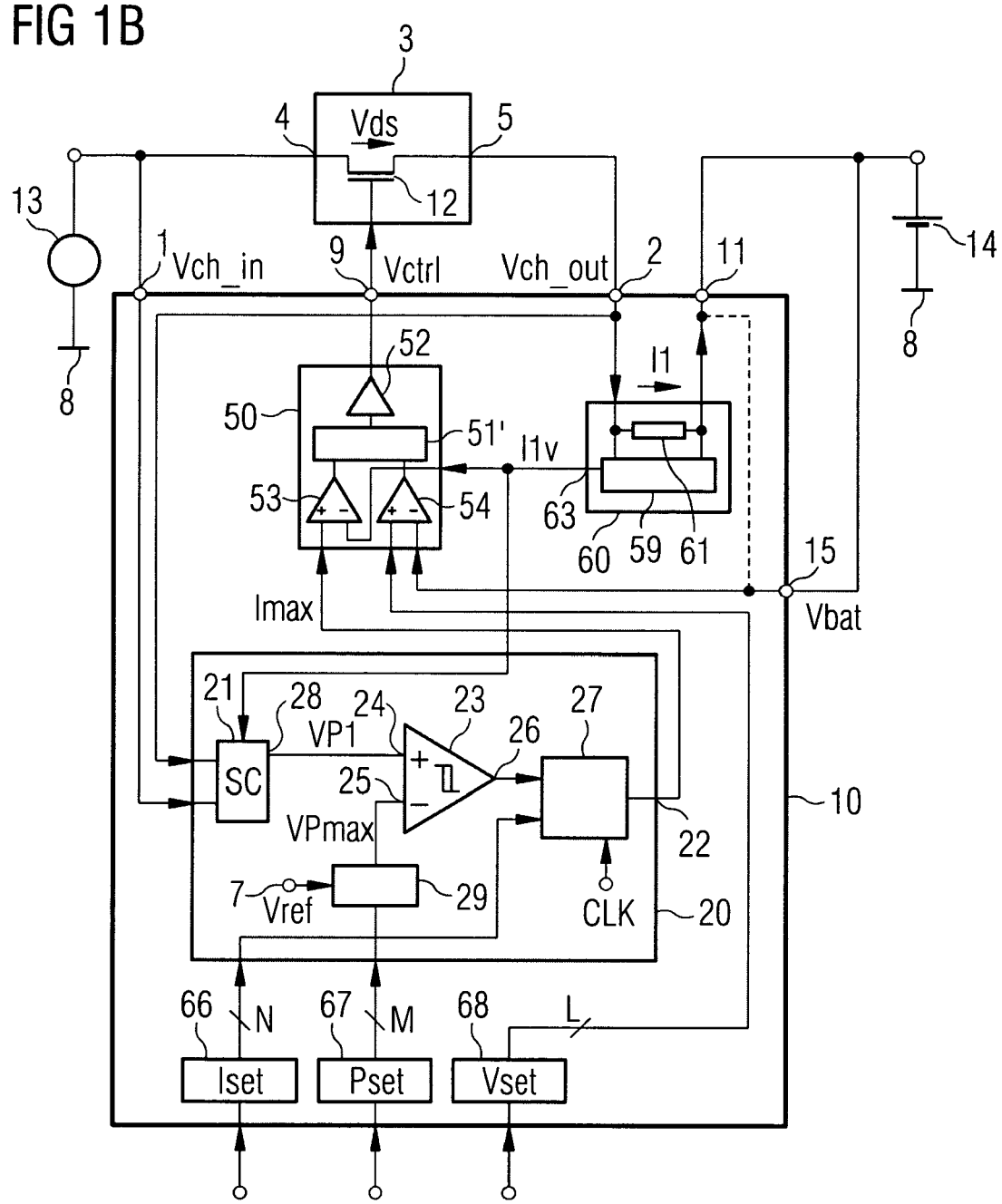

FIG. 1B shows an example refinement of the energy supply arrangement with circuit arrangement 10 according to FIG. 1A. In contrast to the circuit arrangement 10 according to FIG. 1A, in the circuit arrangement 10 according to FIG. 1B, the output 63 of the current determining arrangement 60 is also connected to an input of the switched-capacitor arrangement 21.

In contrast to the control arrangement 50 according to FIG. 1A, in the control arrangement 50 according to FIG. 1B, two comparators 53, 54 are provided. The first comparator 53 has an input coupled to the output 22 of the power determining arrangement 20 and also to the output 63 of the current determining arrangement 60. The second comparator 54 has an input linked to the register 68 and to the third input 15 of the circuit arrangement 10. The first and second comparators 53, 54 have outputs coupled to a computational unit 51'.

Thus, at the output 28 of the switched-capacitor arrangement 21, the product from the charging current value I1v and the difference of the first voltage and the second voltage Vch_in, Vch_out can be tapped as the actual power value VP1. The actual power value VP1 is fed to the first input of the subtracter 23. The maximum current value Imax and also the charging current value I1v are fed to an input of the first comparator 53. The voltage limiting value Vset and the battery voltage Vbat are fed to an input of the second comparator 54. The computational unit 51' is designed to prepare the control signal Vctrl by means of the output driver 52 as a function of the comparison results.

Thus, advantageously, the actual power value VP1 actually consumed in the control component 3 is formed and used for comparison with the adjustable power limiting value VPmax. Advantageously, by means of the two comparators 53, 54, an analog pre-processing of the signals to be compared is performed, so that the computational unit 51' comprises, in a costs-saving way, only a small number of linked logic gates.

Figure 2A:
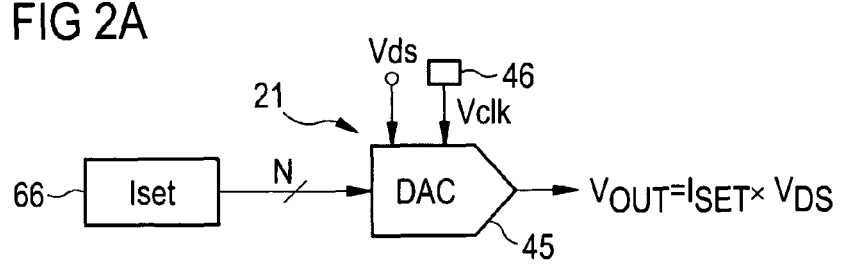
FIGS. 2A to 2D show example devices for determining a power.
Figure 2B:
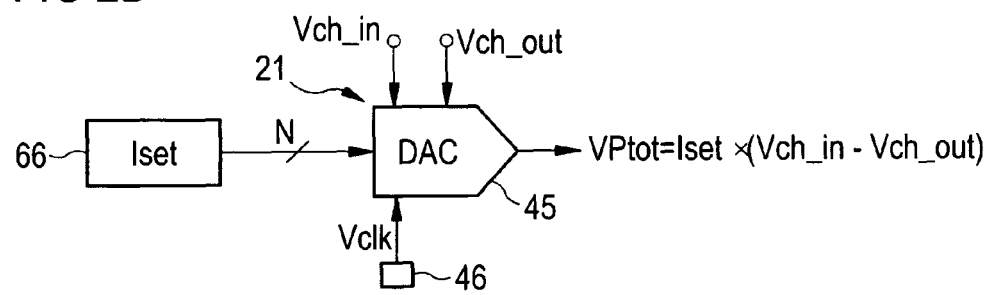
Figure 2C:
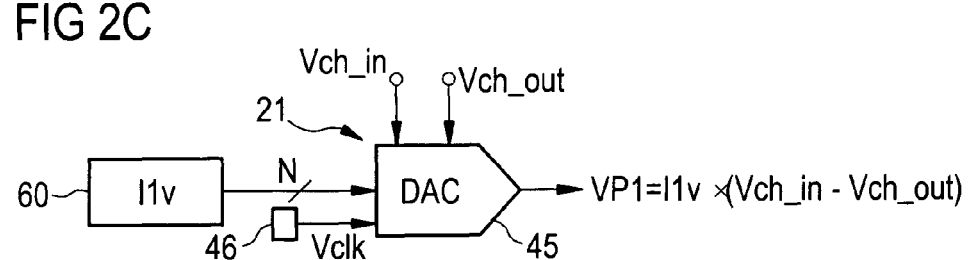
Figure 2D:
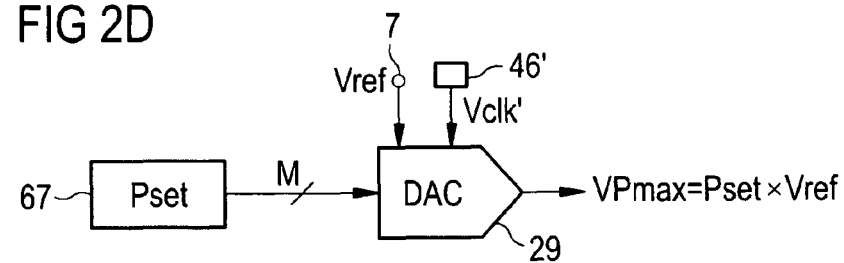

FIGS. 2A to 2D show example devices for determining power. FIGS. 2A to 2C show an example switched-capacitor arrangement 21, as it can be used in the circuit arrangements 1 according to FIGS. 1A and 1B. FIG. 2D shows an example analog/digital converter 29, which can also be used in the circuit arrangements 1 according to FIGS. 1A and 1B.

FIG. 2A shows a switched-capacitor arrangement 21, comprising a digital/analog converter 45 and a clock generator 46, which is coupled to the digital/analog converter 45. The current limiting value Iset is fed by means of N lines to an input of the digital/analog converter 45. The current limiting value Iset is provided as a digitally coded value. The voltage drop Vds is fed as a reference voltage to an input of the digital/analog converter 45. The clock generator 46 prepares control signals for the operation of the digital/analog converter 45. The digital/analog converter 45 thus performs the conversion of the digitally coded current limiting value with the voltage drop Vds as a reference voltage. Thus, at an output of the digital/analog converter 45, an output voltage Vout can be tapped, which is the product of the current limiting value Iset and the voltage drop Vds.

FIG. 2B likewise shows an embodiment example of the switched-capacitor arrangement 21 with the digital/analog converter 45 and the clock generator 46. The current limiting value Iset and also the first voltage Vch_in and the second voltage Vch_out are fed to an input of the digital/analog converter 45. The total power value VPtot, which is a product of the current limiting value Iset and the difference between the first and the second voltage Vch_in, Vch_out, can be tapped at an output of the digital/analog converter 45.

FIG. 2C shows another embodiment example of the switched-capacitor arrangement 21 with the digital/analog converter 45 and the clock generator 46. The charging current value I1v and the first and also second voltages Vch_in, Vch_out are fed to an input of the digital/analog converter 45. According to FIG. 2C, the charging current value I1v is provided as digitally coded information, which is fed via N lines to the digital/analog converter 45. If necessary, the current determining arrangement 60 comprises an analog/digital converter for preparing a digitally coded charging current value I1v. At the output of the analog/digital converter 45, the actual power value VP1 can be tapped, which is the product of the charging current value I1v and the difference between the first and the second voltage Vch_in, Vch_out.

FIG. 2D shows the digital/analog converter 29 having an input to which the digital power limiting value Pset is fed by means of M lines and to which a reference voltage Vref is fed, and a clock generator 46'. At the output of the digital/analog converter 29, the power limiting value VPmax can be tapped, which is a product of the digital power limiting value Pset and the reference voltage Vref. Thus, advantageously, the information provided as digitally coded power limiting value Pset is converted into an analog signal.

Figure 3:
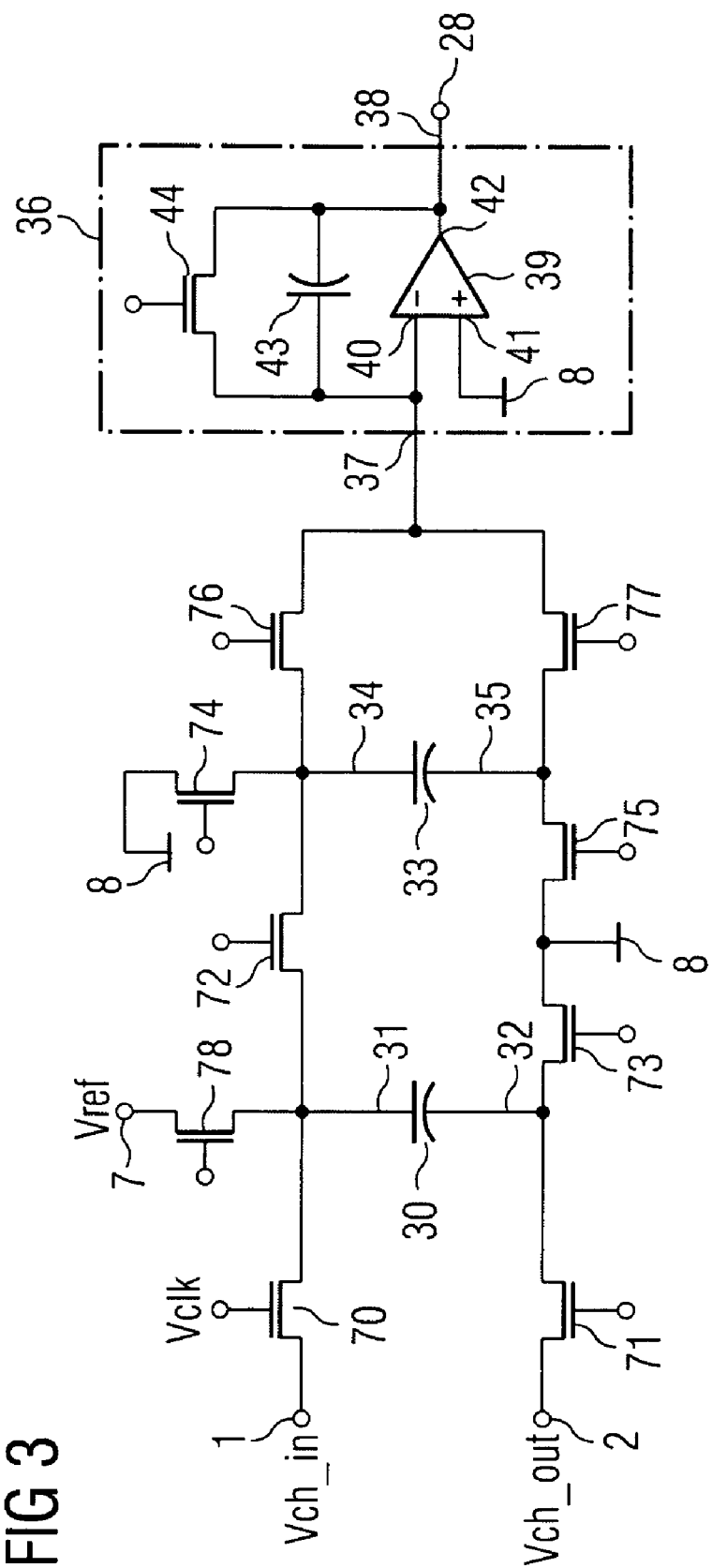
FIG. 3 shows an embodiment of an analog/digital converter in the switched-capacitor arrangement.
Figure 6E:
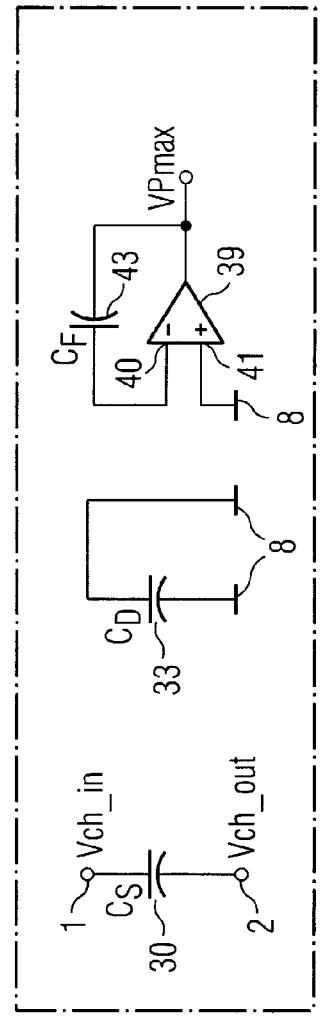
Figure 6F:
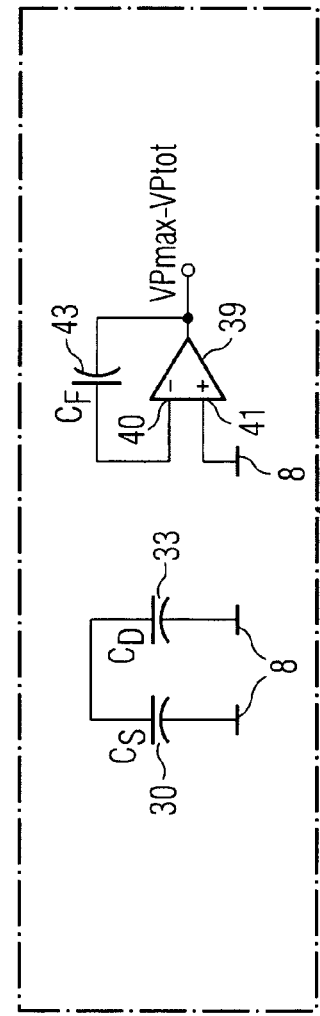
Figure 6G:
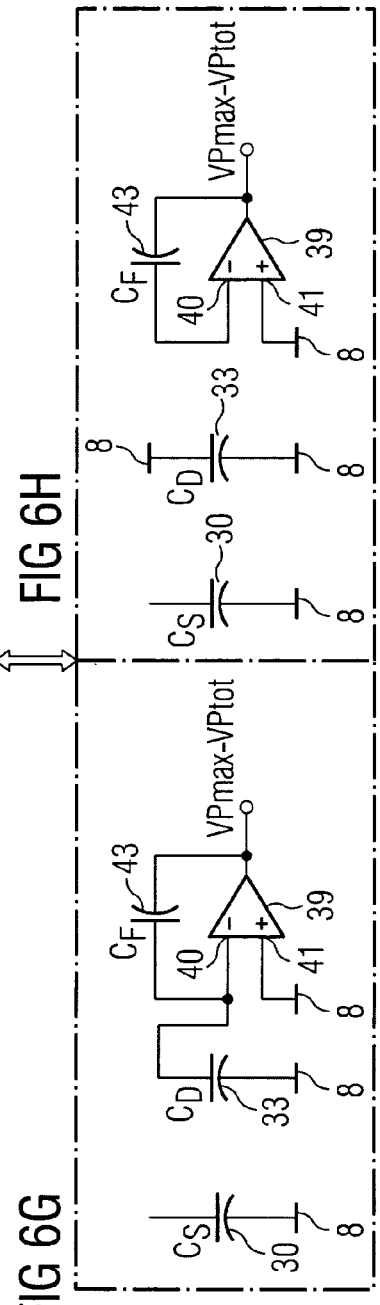

FIG. 3 shows an embodiment example of the digital/analog converter 45 in the switched-capacitor arrangement 21, as they can be used in the circuit arrangements 1 in FIGS. 1A and 1B. The digital/analog converter 45 comprises an input capacitor 30, a transfer capacitor 33, an integrator 36, and eight switches 70-77. The first input 1 of the circuit arrangement 10, at which the first voltage Vch_in can be tapped, is connected via the switch 70 to a first electrode 31 of the input capacitor 30. Accordingly, the second input 2 of the circuit arrangement 10, at which the second voltage Vch_out can be tapped, is linked via the switch 71 to a second electrode 32 of the input capacitor 30. The first electrode 31 of the input capacitor 30 is connected via the switch 72 to a first electrode 34 of the transfer capacitor 33. The second electrode 32 of the input capacitor 30 is coupled via the switch 73 to the reference potential terminal 8. The first electrode 34 of the transfer capacitor 33 is likewise connected via the switch 74 to the reference potential terminal 8 and also via the switch 76 to an input 37 of the integrator 36. A second electrode 35 of the transfer capacitor 33 is connected via the switch 75 to the reference potential terminal 8 and via the switch 77 to the input 37 of the integrator 36. An output 38 of the integrator is connected to the output 28 of the switched-capacitor arrangement 21.

The integrator 36 comprises an amplifier 39, a feedback capacitor 43, and a switch 44. The input 37 of the integrator is connected to an inverting input 40 of the amplifier 39. A non-inverting input 41 of the amplifier 39 is connected to the reference potential terminal 8. An output 42 of the amplifier 39 is connected via a parallel circuit comprising the feedback capacitor 43 and the switch 44 to the inverting input 40 of the amplifier 39. The output 42 of the amplifier 39 is connected via the output 39 of the integrator 36 to the output 28 of the switched-capacitor arrangement. The not-shown clock generator 46 is connected to the control terminals of the transistors 44, 70-77. The function of the components and the circuit is explained in FIGS. 4A-4D, 5A-5D, and 6A-6H.

FIGS. 4A-4D show an example profile in the multiplying DAC 45 of the switched-capacitor arrangement 21 for providing the total power value VPtot. DAC can comprise a multiplying unit. FIGS. 4A-4D are used to explain the processes in the switched capacitor circuit according to FIG. 3. In the FIGS. 4A-4D, the switches are left out in order to simplify the illustration. According to FIG. 4A, the first and the second voltages Vch_in, Vch_out are applied to the input capacitor 30. The transfer capacitor 33 is short-circuited. Likewise, by means of the not-shown switch 44, the feedback capacitor 43 is short-circuited. In this way an output state is set.

In the transition of the switching states from FIG. 4A-4B, the second electrode 32 of the input capacitor 30 is linked to the reference potential terminal 8 and the first electrode 31 of the input capacitor 30 is connected to the first electrode 34 of the transfer capacitor 33. The switch 44 is switched to the open position.

If the bit of the current limiting value Iset has the value one, then according to FIG. 4C the first electrode of the transfer capacitor 33 is connected to the reference potential terminal 8 and also the second electrode 35 of the transfer capacitor 33 is connected to the input of the integrator 36. Thus, charge flows from the transfer capacitor 33 to the feedback capacitor 43 of the amplifier 39.

FIG. 4D shows the relationships for a zero value of the bit of the current limiting value Iset. In this case, both the first and also the second electrodes 34, 35 of the transfer capacitor 33 are linked to the reference potential terminal 8. If the last bit of the current limiting value Iset has not yet been reached, then following FIG. 4D, there is a return to the circuit position according to FIG. 4B. Furthermore, the voltage on the input capacitor 30 is short-circuited by short-circuiting the first electrode 31 of the input capacitor 30 and the first electrode 34 of the transfer capacitor 33. If there is a one value on the bit of the current limiting value Iset, then the process according to FIG. 4C is performed and the smaller charge is added to the feedback capacitor 43. If the bit is in the form of a zero value, then the transfer capacitor 33 is discharged and the charge on the feedback capacitor 43 is not increased. This is repeated until the last bit of the current limiting value Iset is reached. If the register 66 includes a first number of N bits, then the step 4B is performed the first number N times and the steps 4C and 4D together are performed the first number N times.

FIGS. 5A-5D show an example method for determining the power limiting value VPmax by means of the analog/digital converter 29. In contrast to FIGS. 4A-4D, in FIGS. 5A-5D, the input capacitor is connected between the reference voltage Vref and the reference potential terminal 8 for the voltage tapping. The further procedure corresponds to FIGS. 4B-4D. If the digital power limiting value Pset has the value one, charge is transferred to the feedback capacitor 43.

If the corresponding bit of the digital power limiting value Pset has the value zero, then the transfer capacitor 33 is discharged. In this way, advantageously, the power limiting value VPmax is formed and made available at the output of the integrator.

FIGS. 6A-6H show an example method for determining the difference between the power limiting value VPmax and the total power value VPtot. Initially, according to the FIGS. 6A-6D, the input capacitor 30 is connected between a reference voltage terminal 7 for feeding the reference voltage Vref and the reference potential terminal 8 and thus provides the power limiting value VPmax at the output of the integrator 36. According to the steps in FIGS. 6E-6H, the total power value VPtot is subtracted from this power limiting value VPmax. For this purpose, according to FIG. 6E, the input capacitor 30 is connected between the first input and the second input 1, 2 for feeding the first and the second voltage Vch_in, Vch_out.

Figure 7A:
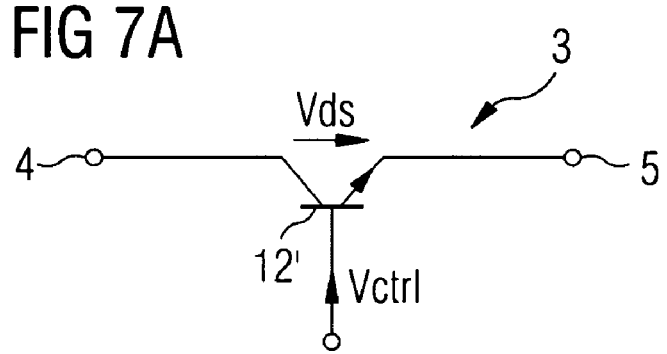
FIGS. 7A and 7B show embodiments of a control component.
Figure 7B:
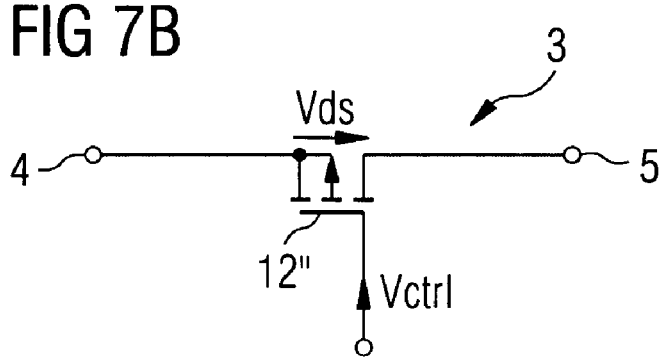

FIGS. 7A-7B show example refinements of the control component 3, as it can be used in the energy-supply arrangements according to FIGS. 1A and 1B.

FIG. 7A shows an embodiment example of the control element 3, which comprises a bipolar transistor 12'. The bipolar transistor 12' is constructed as an NPN bipolar transistor. A controlled section of the bipolar transistor 12' is connected between the first and the second terminal 4, 5. The control voltage Vctrl is fed to a control terminal of the bipolar transistor 12'. Alternatively, a PNP bipolar transistor can be used.

FIG. 7B shows another embodiment example of the control element 3, comprising a field-effect transistor 12", which is connected between the first terminal and the second terminal 4, 5 of the control component 3, and the control voltage Vctrl is applied to a control terminal. The field-effect transistor 12" is realized as a self-blocking p-channel metal-oxide semiconductor field-effect transistor.

Figure 8:
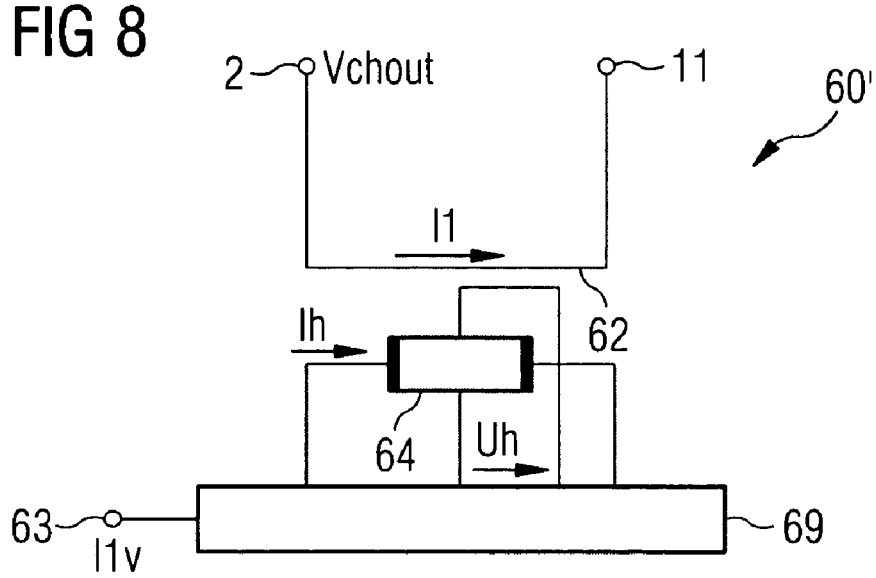
FIG. 8 shows another embodiment of a current determining arrangement.

FIG. 8 shows an embodiment example of a current determining arrangement 60' as can be used in the circuit arrangements 10 of FIGS. 1A and 1B. The current determining arrangement 60' according to FIG. 8 comprises a Hall sensor 64 and an evaluation circuit 69, to which the input and output of Hall sensor 64 are connected. The second input 2 and the second output 11 of the circuit arrangement 10 are connected by means of a line 62. The Hall sensor 64 is arranged on a semiconductor body, which comprises the circuit arrangement 10, in such a way that a magnetic field generated by the current I1 in the Hall sensor 64 enters or exits the semiconductor body. The evaluation circuit 69 prepares the Hall current Ih. At the first Hall sensor 64, a Hall voltage Uh can be tapped, which is fed to the evaluation circuit 69, which determines from this voltage the charging current value I1$\nu$ and provides this value at an output.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for supplying energy, comprising:
   a first input configured to receive a first voltage from a first terminal of a control component;
   a second input configured to receive a second voltage from a second terminal of the control component;
   a first output configured to output a control signal to a control terminal of the control component for controlling an energy supply of an electrical load; and
   a power determining arrangement, comprising a switched-capacitor arrangement having an input coupled to the first and the second inputs of the circuit arrangement and an output coupled to the first output of the circuit arrangement;

wherein the switched-capacitor arrangement multiplies a difference between the first and second voltages with a digitally coded current limiting value.

2. The circuit arrangement according to claim 1, wherein the switched-capacitor arrangement comprises a multiplying unit.

3. The circuit arrangement according to claim 2, wherein the multiplying unit is a digital/analog converter, to which the digitally coded current limiting value is fed as digital information and to which the difference between the first and the second voltages is fed as a reference voltage.

4. The circuit arrangement according to claim 2, wherein the multiplying unit comprises:
an input capacitor, which is connected at a first electrode to the first input of the circuit arrangement and at a second electrode to the second input of the circuit arrangement and a reference potential terminal;
a transfer capacitor, which is coupled at a first electrode to the first electrode of the input capacitor and to the reference potential terminal and at a second electrode to the reference potential terminal; and
an integrator, which is coupled at an input to the first and the second electrode of the transfer capacitor and which has an output, which is coupled to the output of the switched-capacitor arrangement.

5. The circuit arrangement according to claim 4, wherein the integrator comprises:
an amplifier, which is coupled at an inverting input to the input of the integrator, at a non-inverting input to the reference potential terminal and at an output to the output of the integrator;
a feedback capacitor, which is connected between the inverting terminal of the amplifier and the output of the amplifier; and
a switch, which is connected between the inverting input of the amplifier and the output of the amplifier.

6. The circuit arrangement according to claim 2, wherein the multiplying unit comprises at least one switch, which is switched as a function of at least one control signal.

7. The circuit arrangement according to claim 2, wherein the switched-capacitor arrangement comprises a clock generator, which is coupled to the multiplying unit.

8. The circuit arrangement according to claim 1, wherein the power determining arrangement comprises a subtracter, which is coupled at a first input to the output of the switched-capacitor arrangement, to which a power limiting value is fed at a second input of the subtracter and which is coupled at an output to the first output of the circuit arrangement.

9. The circuit arrangement according to claim 8, wherein the subtracter is a comparator.

10. The circuit arrangement according to claim 8, wherein the power determining arrangement comprises a correction device, which is connected between the output of the subtracter and the output of the power determining arrangement, to which a current limiting value is fed and which is configured to provide a maximum current value.

11. The circuit arrangement according to claim 10, wherein the switched-capacitor arrangement multiplies the difference between the first and the second voltages with a current value, and wherein a current limiting value is fed as the digitally coded current limiting value to the switched-capacitor arrangement.

12. The circuit arrangement according to claim 10, wherein the circuit arrangement comprises a current determining arrangement, which is coupled to the second input and the second output of the circuit arrangement and which is provided for determining a charging current value of the charging current;

wherein the control arrangement has a digital computational unit and a driver circuit, wherein the driver circuit is connected between the digital computational unit and the first output for providing the control signal, and wherein the control arrangement comprises:
a first comparator having an input coupled to the output of the power determining arrangement for feeding the maximum current value and the output of the current determining arrangement for feeding the charging current value, and
a second comparator having an output coupled to the second output of the circuit arrangement for feeding a battery voltage and to which a voltage limiting value is fed, wherein the first and the second comparator have outputs coupled to the digital computational unit.

13. The circuit arrangement according to claim 1, wherein a charging current is fed to the circuit arrangement at the second input and the circuit arrangement comprises a second output for the output of the charging current.

14. The circuit arrangement according to claim 13, wherein the circuit arrangement comprises a current determining arrangement, which is coupled to the second input and the second output of the circuit arrangement and which is provided for determining a charging current value of the charging current.

15. The circuit arrangement according to claim 14, wherein the current determining arrangement comprises a resistor, which is connected between the second input and the second output of the circuit arrangement.

16. The circuit arrangement according to claim 14 wherein the current determining arrangement comprises a Hall sensor for determining a magnetic field of the charging current.

17. The circuit arrangement according to claim 14, wherein the switched-capacitor arrangement is coupled to an output of the current determining arrangement for feeding the charging current value as the current value.

18. The circuit arrangement according to claim 14, wherein the circuit arrangement comprises a control arrangement having an input coupled to the output of the power determining arrangement and an output coupled to the first output of the circuit arrangement, and wherein the control arrangement has an input coupled to an output of the current determining arrangement for feeding the charging current value and is adapted for the output of the control signal as a function of a comparison of the charging current value and a maximum current value.

19. The circuit arrangement according to claim 1, wherein the circuit arrangement comprises a control arrangement having an input coupled to the output of the power determining arrangement and an output coupled to the first output of the circuit arrangement.

20. The circuit arrangement according to claim 19 wherein the circuit arrangement is coupled to a third input of the circuit arrangement for feeding a battery voltage, a voltage limiting value is fed to the control arrangement, and the control arrangement outputs the control signal as a function of a comparison of the battery voltage with the voltage limiting value.

21. The circuit arrangement according to claim 19, wherein the control arrangement has a digital computational unit and a driver circuit, wherein the driver circuit is connected between the digital computational unit and the first output for providing the control signal.

22. An energy-supply arrangement, comprising a circuit arrangement according to claim 1, and a control component, which is coupled at the first terminal to the first input of the circuit arrangement, at the second terminal to the second input of the circuit arrangement and at the control terminal to the first output of the circuit arrangement.

23. The energy-supply arrangement according to claim 22, wherein the control component comprises a transistor.

24. The energy-supply arrangement according to claim 22, wherein the energy-supply arrangement comprises a power-supply part, which is coupled to the first terminal of the control component.

25. The energy-supply arrangement according to claim 22, wherein the energy-supply arrangement comprises a rechargeable battery, which is coupled to the second terminal of the control component.

26. A method for charging a battery, comprising the steps of:
   controlling a charging current of the battery by of a control component;
   determining a power value as a function of a voltage drop between two current-carrying terminals of the control component and a current value by a switched-capacitor arrangement;
   comparing the power value with a power limiting value; and,
   controlling the charging current as a function of the comparison result by means of a control signal;
   wherein the switched-capacitor arrangement multiplies a difference between the first and second voltages with a digitally coded current limiting value.

27. The method according to claim 26, further comprising: determining the power value as a total power value by multiplying the voltage drop by a given current limiting value by the switched-capacitor arrangement.

28. The method according to claim 26, comprising determining the power value in the form of an actual power value by multiplying the voltage drop by a charging current value dependent on the charging current of the battery by means of the switched-capacitor arrangement.

29. A circuit arrangement for supplying energy from a power source to an electrical load, comprising:
   a control component having a control terminal for controlling energy supply to the electrical load, an input coupled to the power source, and an output coupled to the load; and
   a power determining arrangement, comprising a switched-capacitor arrangement, having input means coupled to said input and output of the control component, and an output coupled to said control terminal, first and second voltages being tapped at said input and output of the control component via the input means of the power determining arrangement;
   wherein the switched-capacitor arrangement multiplies a difference between the first and second voltages with a digitally coded current limiting value.

30. A circuit arrangement for supplying energy, comprising:
   a first input configured to receive a first voltage from a first terminal of a control component;
   a second input configured to receive a second voltage from a second terminal of the control component;
   a first output configured to output a control signal to a control terminal of the control component for controlling an energy supply of an electrical load;
   a power determining arrangement, comprising a switched-capacitor arrangement having an input coupled to the first and the second input of the circuit arrangement and an output coupled to the first output of the circuit arrangement;
   a current determining arrangement which is configured to determine a charging current value; and
   a first comparator of the circuit arrangement is connected on its input side to the output of the power determining arrangement for receiving a maximum current value and to the output of the current determining arrangement for receiving the charging current value, the first comparator providing a signal as a result of the comparison of the maximum current value and the charging current value;
   wherein the power determining arrangement comprises a subtractor, which is coupled at a first input of the subtractor to the output of the switched-capacitor arrangement, to which a power limiting value is fed at a second input of the subtractor and which is coupled at an output of the subtractor to the first output of the circuit arrangement; and
   wherein the power determining arrangement comprises a correction device, which is connected between the output of the subtracter and the output of the power determining arrangement, to which a current limiting value is fed and which is configured to provide the maximum current value.

* * * * *

UNITED STATES PATENT AND TRADEMARK OFFICE
CERTIFICATE OF CORRECTION

| | |
|---|---|
| PATENT NO. | : 8,350,536 B2 |
| APPLICATION NO. | : 12/087022 |
| DATED | : January 8, 2013 |
| INVENTOR(S) | : Manfred Lueger |

Page 1 of 1

It is certified that error appears in the above-identified patent and that said Letters Patent is hereby corrected as shown below:

IN THE CLAIMS:

In Column 13, Line 21, Claim 26

Replace "controlling a charging current of the battery by of a control component"

with --controlling a charging current of the battery by a control component--.

Signed and Sealed this
Twenty-fifth Day of June, 2013

Teresa Stanek Rea
*Acting Director of the United States Patent and Trademark Office*